(12) United States Patent
Tsuchiya et al.

(10) Patent No.: US 7,980,746 B2
(45) Date of Patent: Jul. 19, 2011

(54) HOLLOW TYPE PLANAR ILLUMINATING DEVICE

(75) Inventors: Ryuji Tsuchiya, Imabari (JP); Yoji Kawasaki, Imabari (JP)

(73) Assignee: Harison Toshiba Lighting Corporation, Imabari-shi (JP)

( * ) Notice: Subject to any disclaimer, the term of this patent is extended or adjusted under 35 U.S.C. 154(b) by 0 days.

(21) Appl. No.: 12/682,683

(22) PCT Filed: Oct. 7, 2008

(86) PCT No.: PCT/JP2008/068221
§ 371 (c)(1),
(2), (4) Date: Apr. 12, 2010

(87) PCT Pub. No.: WO2009/048053
PCT Pub. Date: Apr. 16, 2009

(65) Prior Publication Data
US 2010/0208490 A1    Aug. 19, 2010

(30) Foreign Application Priority Data

Oct. 12, 2007 (JP) ................................. 2007-266878

(51) Int. Cl.
*F21V 7/04* (2006.01)
(52) U.S. Cl. ........ 362/609; 362/606; 362/607; 362/613; 362/632
(58) Field of Classification Search .......... 362/606–607, 362/609, 611–613, 632–634
See application file for complete search history.

(56) References Cited

U.S. PATENT DOCUMENTS

| | | | |
|---|---|---|---|
| 6,257,737 | B1 | 7/2001 | Marshall et al. |
| 2003/0048639 | A1 | 3/2003 | Boyd et al. |
| 2005/0196123 | A1 | 9/2005 | Kumagai |
| 2007/0153548 | A1 | 7/2007 | Hamada et al. |

FOREIGN PATENT DOCUMENTS

| | | |
|---|---|---|
| JP | 2005-251566 A | 9/2005 |
| JP | 2005-316337 A | 11/2005 |
| JP | 2006-106212 A | 4/2006 |
| JP | 2006-156231 A | 6/2006 |
| JP | 2006-156324 A | 6/2006 |

OTHER PUBLICATIONS

International Search Report received for International Application No. PCT/JP2008/068221 mailed Nov. 4, 2008.
International Preliminary Examination Report mailed on May 20, 2010, for PCT Application No. PCT/JP2008/068221.

*Primary Examiner* — Sandra L O Shea
*Assistant Examiner* — Meghan K Dunwiddie
(74) *Attorney, Agent, or Firm* — Banner & Witcoff, Ltd.

(57) ABSTRACT

A hollow type planar illuminating device having uniform luminance distribution over the entire light emitting is described. A reflecting surface member is arranged on the bottom side of a hollow unit case, a light emitting surface member is arranged on the side facing the reflecting surface member of the unit case, and a space sandwiched between the reflecting surface member and the light emitting surface member of the unit case forms a hollow light guide space. An LED light source unit emits light into the hollow light guide space with a light collecting lens arranged between the LED light source unit and an end surface of the hollow light guide space. The light collecting lens reduces the directivity angle of light emitted from the LED light source unit in the device thickness direction.

11 Claims, 9 Drawing Sheets

HOLLOW TYPE PLANAR ILLUMINATING DEVICE

BACKGROUND OF THE INVENTION

1. Field of the Invention

The present invention relates to a hollow type planar illuminating device configured to emit illuminating light of uniform luminance distribution from a light emitting surface thereof such as a backlight unit for a liquid crystal display apparatus, for example.

2. Description of the Related Art

In recent years, a light source of a backlight unit for a liquid crystal display apparatus has accelerated a move toward replacement of a cold cathode discharge lamp with an LED. This is because the LED is suitable as an environment-conscious light source without use of mercury that is harmful material or because power consumption of the LED can be significantly small due to recent drastic enhancement of LED light emitting efficiency. A backlight unit having an LED as a light source has been used mostly for a small-sized apparatus such as a cellular phone or mobile terminal until now. However, the backlight unit having the LED as a light source has been increasingly used for a large-sized liquid crystal display apparatus such as a liquid crystal monitor or a liquid crystal TV set of 20-inch or larger.

A backlight unit used in a large-sized liquid crystal display apparatus is required to have higher brightness. Accordingly, a direct type backlight unit having an LED light source beneath a surface emitting portion is generally widely used as a backlight unit for a large-sized liquid crystal display apparatus, as disclosed in Japanese Patent Application Laid-Open No. 2005-316337. However, in the direct type LED backlight unit, LEDs that are point light sources having directivity are used. Therefore, a short distance between a plurality of arranged LEDs and a surface emitting portion causes uneven brightness or color. If such uneven brightness or color is generated in the LED backlight unit, the display quality of liquid crystal illuminated by the backlight unit is degraded. This phenomenon further remarkably appears when high-power LEDs of 1 W class or higher per unit are used as a light source to attain high brightness. On the other hand, when a distance between the LEDs and the surface emitting portion (diffusion plate) is lengthened to reduce uneven brightness or color, a thickness of the whole device increases. For example, in order to achieve a light source having NTSC contrast ratio of 100% or more by using single-color light-emitting LEDs for each of blue, red and green for enhancement of color reproducibility on a liquid crystal panel, it is necessary to ensure color mixing properties; therefore a further increase in the thickness of the apparatus is required. However, such an increased thickness is not preferable, which is against a recent tendency of slimness of a liquid crystal display apparatus.

In addition, a direct type backlight unit using white light-emitting LEDs as a light source has been developed for commercial availability. However, each of the white light emitting LEDs uses blue light emitted by LEDs and yellow light emitted by a phosphor mounted in the vicinity of the chip. Accordingly, when such white light emitting LEDs are used as a light source, the light emitted from the backlight is perceived as white; however, there is posed a problem of generation of an unmatched color, for example, when the light passes through a liquid crystal display panel. Accordingly, there are many problems in application of such a direct type backlight unit using white light emitting LEDs as a light source to a liquid crystal monitor for medical purpose or computer graphics, which require higher color reproducibility.

As a solution for such problems in the direct type backlight unit, there is also known a side light type backlight unit which guides emitted light from an LED light source arranged at an end portion within a device through an end surface of a light guide plate, reflects and diffuses the light on a reflecting surface thereof and emits the light from a light emitting surface on the opposite side. However, in the case of the side light type backlight unit using the light guide plate, when the light emitting surface is enlarged to meet a recent bigger a screen for a liquid crystal display apparatus, it is necessary to significantly increase the area of the light guide plate in the same way as a light emitting surface. Use of such an enlarged light guide plate poses a problem of increasing the overall weight of the apparatus.

Further, in recent years, there is also known a hollow type backlight unit which reflects the light incident from the outside in a hollow light guide space to emit the light evenly from a surface emitting portion and irradiate a liquid crystal panel in the front thereof with the light, as disclosed in Japanese Patent Application Laid-Open No. 2006-106212. The conventional hollow type backlight unit has an advantage that the weight of a device is not remarkably increased even if the area of backlight unit is enlarged to meet bigger screen enlargement of a liquid crystal display apparatus because a member remarkably increasing the weight such as a light guide plate is not employed.

However, in the conventional hollow type backlight unit, when a light collecting lens is used on the light emitting surface side of an LED light source unit to reduce a light emitting angle of the light from the LED and a white-based reflecting sheet excellent in light reflection properties is used as a reflecting surface member, in particular, the light is collected into a flat beam through the light collecting lens, so that the light concentrates in a fixed region of the hollow light guide reflecting sheet. Accordingly, the light spectrally-reflected in the region is applied to a fixed region of the light emitting surface member and thus there is posed a problem of generation of a brighter line in a corresponding region of the light emitting surface.

SUMMARY OF THE INVENTION

The present invention relates to improvement of hollow type planar illuminating device proposed above. It is an object of the present invention to provide a hollow type planar illuminating device that is of a side light system, capable of attaining more uniform luminance distribution over the entire light emitting surface.

A term "side light system" used herein refers to an illumination system that emits light in a direction parallel to a light emitting surface from a light source unit sideway of a rear portion of the light emitting surface, and refract, reflect and diffuse the light to be guided onto the light emitting surface.

According to the present invention, there is provided a hollow type planar illuminating device, including: a reflecting surface member disposed on a bottom surface of a hollow unit case and having a reflecting surface inclined with respect to the bottom surface; a light emitting surface member disposed at a position within the unit case facing the reflecting surface member in parallel to the bottom surface of the unit case; an LED light source unit including a plurality of LEDS arranged to be adjacent to each other on at least either side of a hollow light guide space extending between the light emitting surface member and the reflecting surface member, and emitting light to the hollow light guide space; and alight collecting lens disposed along the LED light source unit to reduce a directivity angle of the light emitted from the LED light source unit, in which the roughness Ra of the surface facing the hollow light guide space of the reflecting surface member is 1 μm<Ra<10 μm.

The hollow type planar illuminating device of the present invention provides a rougher surface than an ordinary mirror surface with a roughness Ra of a surface facing a hollow light guide space of a reflecting surface member configured at 1 μm<Ra<10 μm, thereby attaining increased diffusion properties than the mirror surface without degrading reflectivity. Thus, the light from the LED light source unit through the light collecting lens can be reflected toward a light emitting surface while being evenly diffused to a reflecting surface member surface, thereby achieving light emission without generation of a brighter line on a light emitting surface and uneven brightness or chromaticity.

DESCRIPTION OF THE PREFERRED EMBODIMENTS

Embodiments of the present invention will be described in detail with reference to the accompanying drawings.

First Embodiment

Figure 1:
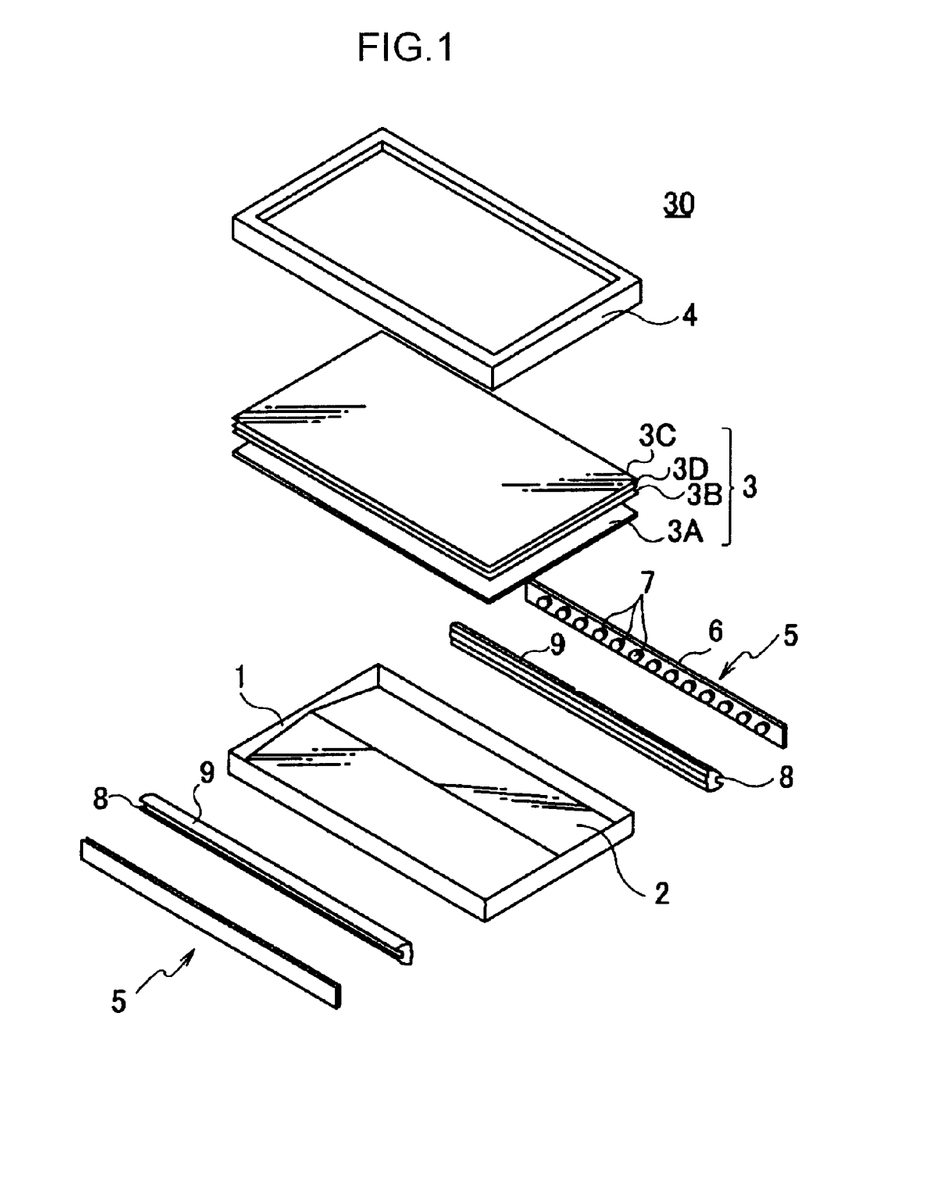
FIG. 1 is an exploded perspective view of a backlight unit according to a first embodiment of the present invention.
Figure 2:
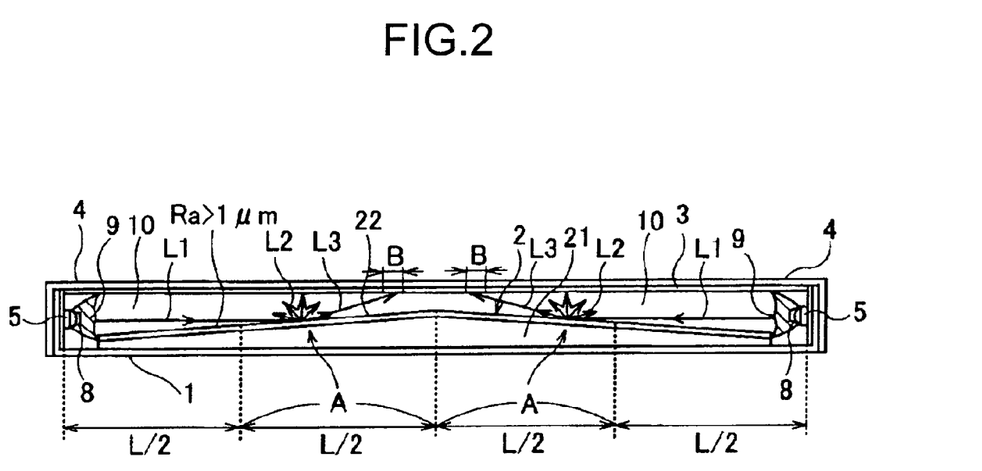
FIG. 2 is a cross-sectional view of the backlight unit according to the first embodiment.

FIGS. 1 and 2 illustrate a backlight unit 30 for a liquid crystal display apparatus which employs a hollow type planar illuminating apparatus according to a first embodiment of the present invention. In the backlight unit 30, a line in parallel to one side of the unit case 1 in the middle of a bottom surface thereof is defined as a ridge line and a mountain-shaped reflecting surface member 2 having an inclined surface on each of both sides of the ridge line is disposed. On an open surface of the unit case 1, a light emitting surface member 3 is disposed. An open surface of the unit case 1 has a front frame 4 covering a peripheral edge portion of the light emitting surface member 3 and is integrated with the unit case 1. The unit case 1 is formed from metal having high thermal conductivity, such as aluminum alloy.

A space extending between the reflecting surface member 2 and the light emitting surface member 3 in the unit case 1 is a hollow light guide space 10 rectangular in view of plane. At both side portions parallel to a ridge line of the reflecting surface member 2 in the unit case 1, an LED collimator lens 9 serving as a light collecting lens and an LED light source unit 5 are disposed.

The reflecting surface member 2 is comprised of a mountain-shaped base material 21 having a line parallel to one side of the unit case 1 as a ridge line in the center of a bottom surface of the rectangular unit case 1 and a diffusion reflecting sheet 22 having high reflectivity and diffusion reflectivity to be layered on the surface of the base material 21. The mountain-shaped base material 21 is a resin molded article using polycarbonate or the like of high reflection grade, for example. The diffusion reflecting sheet 22 is a sheet material made of, for example, white PET film, white ink, or high reflective aluminum having mirror surface reflectivity, coated with light transmissive diffusion material. The surface of the diffusion reflecting sheet 22 is roughed by appropriate processing, such as blast treatment or sand paper. The reflecting surface member 2 is formed by transferring the diffusion reflecting sheet 22 processed in this way onto the reflecting surface of the mountain-shaped base material 21. However, the reflecting surface member 2 may be formed by transferring a rough diffusion sheet having a rough surface onto a reflecting surface of the mountain-shaped base material 21. In addition, the reflecting surface member 2 may be formed by applying blast processing directly to the mountain-shaped base material 21. Here, a surface roughness Ra of the diffusion reflecting sheet 22 of the reflecting surface member 2 is Ra>1 μm, preferably 3 to 10 μm, more preferably 5 to 6 μm. Usually, in mirror-finishing the surface of the reflecting surface member, the roughness Ra of the surface is Ra≦0.01 μm. On the other hand, the surface of the reflecting surface member 2 in the present embodiment has more than 100-fold roughness. The roughness Ra of the surface is controlled by the grit number of blast or sandpaper. The grit number to be used depends upon design of the backlight unit 30. For example, in the present embodiment, the grit number of blast is approximately 40 to 200. The grit number of sandpaper is approximately 60 to 600. The roughness Ra is a value obtained by totalizing and averaging absolute values of deviations F(x) in rough portions on the surface over a reference length L, which is expressed by $Ra = 1/L \cdot \int \approx |F(x)| dx$.

Ra can be exactly measured, using a laser microscope or an Atomic Force Microscope (AFM).

The light emitting member 3 is structured by laminating optical sheets, such as diffusion sheets 3B, 3C and a lens sheet 3D on a light transmission diffusion plate 3A. The light emitting member 3 can uniformly diffuse and emit the light passing through the hollow light guide space 10 and reflected on the mountain-shaped reflecting surface member 2. Thus, the light emitting surface member 3 can eliminate uneven brightness on the light emitting surface to increase a uniformity ratio of illuminance.

The LED light source unit 5 is structured by mounting a plurality of LEDs 7 in a row or a plurality of rows on an elongated wiring board 6 having a width large enough to be stored within a corresponding side face portion of the unit case 1. The wiring board 6 is formed from metal, such as aluminum-based or aluminum alloy-based material having high thermal conductivity, or ceramic such as aluminum nitride. Such a wiring board 6 is fixed on the side wall of the unit case 1 having high thermal conductivity by screwing, bonding or other appropriate means. Preferably, between the wiring board 6 and the unit case 1, double-faced tape, sheet or grease having high thermal conductivity is interposed.

On the light emission side of the LED light source unit 5, there is disposed the elongated LED collimator lens 9 having a recessed groove 8 into which the emitted light from the LED 7 is incident. The LED collimator lens 9 is comprised of the sideways recessed groove 8 into which the emitted light from the plurality of LEDs 7 mounted on the LED light source unit 5 is incident, a curved total reflecting surface connected to the upper and lower portions of the recessed groove 8 and a radiating surface formed by joining two flat surfaces to each other, sandwiching the curved surface. The light collected into substantially parallel light is incident into the hollow light guide space 10 from the radiating surface. Such an LED collimator lens 9 is formed from transparent resin such as acryl or polycarbonate, or glass, for example.

Figure 3:
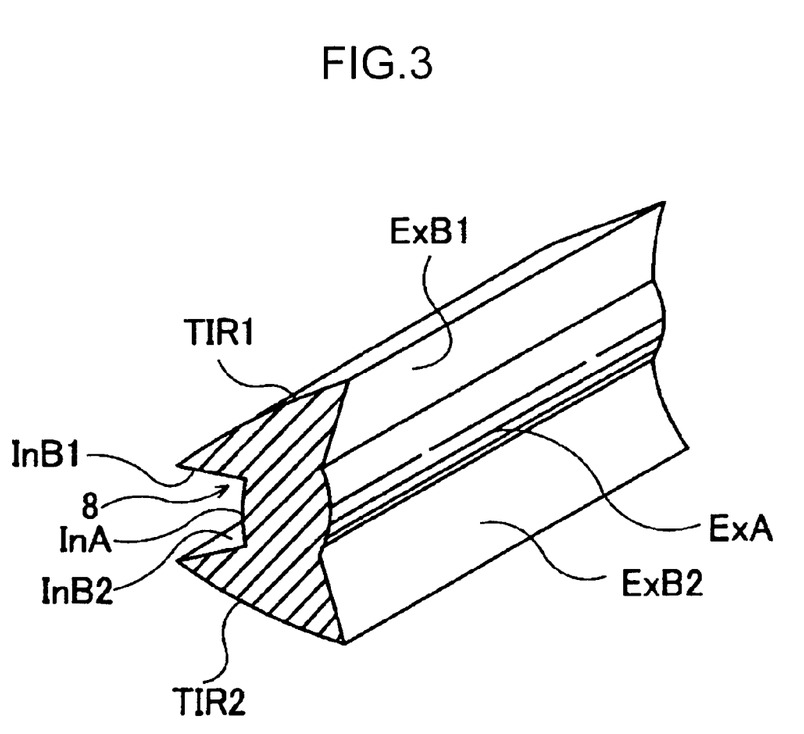
FIG. 3 is a partially cutout perspective view of an LED collimator lens in the backlight unit according to the first embodiment.
Figure 4:
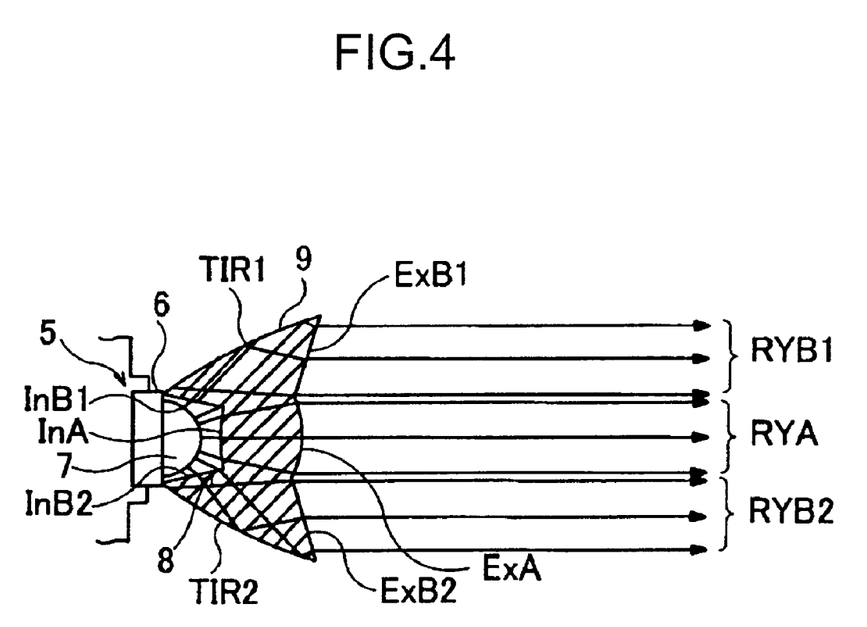
FIG. 4 is a cross-sectional view illustrating light-collecting characteristics of the LED collimator lens according to the first embodiment.

FIGS. 3 and 4 are a partially enlarged view and a sectional view, respectively, illustrating a more detailed structure of the LED collimator lens 9. The LED collimator lens 9 has the recessed groove 8 open to an incidence portion side facing the LED 7. The groove wall surface of the recessed groove 8 is comprised of a convex incidence surface 1 nA for guiding the emitted light having an angle closer to an optical axis of the LED 7 into the apparatus and flat incidence surfaces InB1, InB2 for guiding the emitted light having an angle distant from the optical axis of the LED 7 into the device. The side faces positioned at the upper and lower outer-peripheral portions of the LED collimator lens 9 are comprised of total internal reflection surfaces TIR1, TIR2 curved to totally reflect the light into the apparatus. The light emission portion of the LED collimator lens 9 is comprised of a convex emission surface ExA corresponding to the incident light from the incident surface 1 nA and recessed curved emission surfaces ExB1, ExB2 corresponding to the light incident on the incident surfaces InB1, InB2 and then totally reflected on the total internal reflection surfaces TIR1, TIR2. As illustrated in FIG. 4 in detail, the light emitted from the LED 7 of the LED light source unit 5 is collected in a thickness direction of the unit case 1 or the hollow light guide space 10 by the LED collimator lens 9 and is incident into the hollow light guide space with a flat luminous flux as a whole. That is to say, in the LED collimator lens 9, the light RYA incident into the incident surface 1 nA from the LED 7 is refracted on the incident surface 1 nA and the emission surface ExA having a convex shape in cross section and is collected into a thickness direction of the hollow light guide space 10. The light RYB1, RYB2 incident on the incident surfaces InB1, InB2 are collected into a thickness direction of the hollow light guide space 10 by total internal reflection on the total internal reflection surfaces TIR1, TIR2 and refraction on the emission surfaces ExB1, ExB2.

The light RYA, RYB1, RYB2 emitted into the hollow light guide space 10 from the LED collimator lens 9 are reflected in a direction of the reflecting surface member 3 on a mountain-shaped reflecting surface of the reflecting surface member 2 having an optimum shape and emitted with high brightness and without uneven brightness from the light emitting surface of the light emitting surface member 3.

According to a backlight unit 30 of the present embodiment, the light radiated at a wide angle from the LED 7 serving as a light source can be collected with high efficiency of more than 80% of light utilization efficiency and at a narrow angle due to the presence of the LED collimator lens 9. Thus, reflection loss in the hollow light guide space 10 can be suppressed to the minimum, thereby to improve the brightness of the light emitting surface.

In addition, according to the backlight unit 30 of the present embodiment, the diffusion reflecting sheet 22 having excellent diffusion reflection characteristics is disposed on the surface facing the hollow light guide space 10 of the reflecting surface member 2 and the roughness Ra of the surface of the diffusion reflecting sheet 22 is set at Ra>1 μm, thus preventing a brighter line from occurring on the light emitting surface. Specifically, as illustrated in FIG. 2, the radiation angle in a thickness direction of the hollow light guide space 10 is narrowed from the LED light source unit 5 through the collimator lens 9 and a luminous flux L1 having a flat cross section in which the optical axis direction is aligned travels in parallel to the light emitting surface in the hollow light guide space 10. A region A of the reflecting surface member 2, the height of an inclined surface of which becomes larger as a given point on the surface goes more forward, is irradiated with the luminous flux L1. As illustrated in FIG. 2, the region A is a region corresponding to that of L/2 to L, where L is a distance between the collimator lens 9 and an apex portion of the reflecting surface member 2. That is to say, the region A is a band-shaped region in which a reflecting surface is directly irradiated with the light emitted from the LED light source unit and collected into a flat shape by the collimator lens 9.

Assuming that the surface of the irradiation region A has a surface roughness of Ra>1 μm, incident light scatters and reflects so as to disperse in all directions within the region A as shown by an arrow L2. Accordingly, as shown by an arrow L3, no brighter line appears, in contrast to the case of a conventional mirror surface that causes most of incident light to be spectrally-reflected, reaching a region B of a light emitting surface. As a result, the backlight unit 30 in the present embodiment prevents a brighter line from occurring on a light emitting surface, thus attaining light emission with highly uniform brightness. From an observation of a luminance distribution on the reflecting surface using a reflecting surface member 2 having a surface state of Ra=5 to 6 μm in an experiment, it can be verified that a problem of brighter line occurrence is solved and a luminance distribution with high uniformity ratio of illuminance can be achieved.

In the present embodiment, a surface state of the diffusion reflecting sheet 22 on the surface of the reflecting surface member 2 is made to have roughness Ra>1 μm over the entire surface; however, the present invention is not limited thereto. Only a portion corresponding to the region A illustrated in FIG. 2 may be made into a surface having roughness Ra>1 μm and other portions may use a flat smooth surface of roughness Ra≦1 μm, what is more, a mirror-state surface.

Figure 5A:
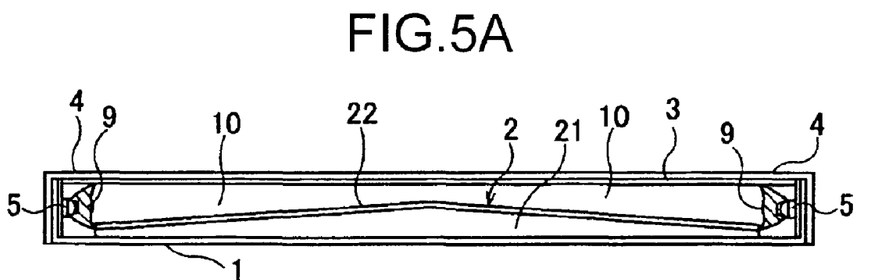
FIG. 5A to 5C are cross-sectional views illustrating a modified example of a structure of a reflecting surface member in a backlight unit according to the first embodiment.

While the shape of the reflecting surface member 2 is described as a reflecting surface member linearly lowering from a ridge line to the LED light source unit 5 as illustrated in FIG. 5A, a reflecting surface member 2A comprised of inclined surfaces having concave curved surface on both sides of the ridge line may be used. In addition, as illustrated in FIG. 5C, there may be used a reflecting surface member 2B comprised of an inclined surface 2B1 having a concave curved surface in the vicinity of the ridge line and a flat surface 2B2 having a constant height in a portion near the LED light source unit 5.

For a light collecting lens, a typical cylindrical lens may be used in place of a total internal reflection collimeter lens 9. Further, the reflecting surface member 2 may be a member having a surface treated into reflective diffusing surface by forming an integrated article.

Second Embodiment

Figure 6A:
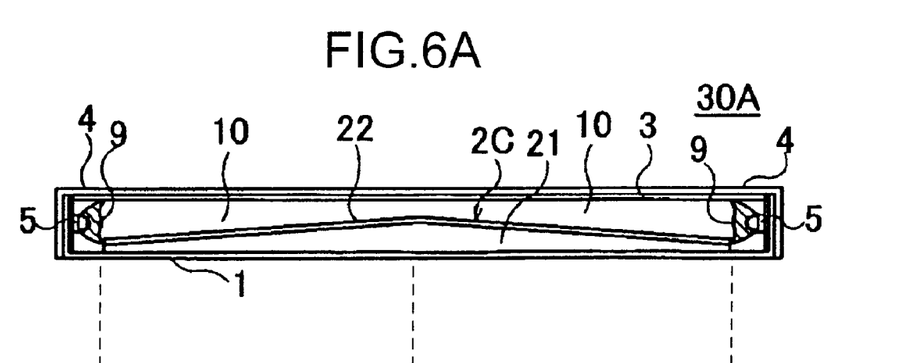
FIG. 6A is a cross-sectional view of a backlight unit according to a second embodiment of the present invention.
Figure 6B:
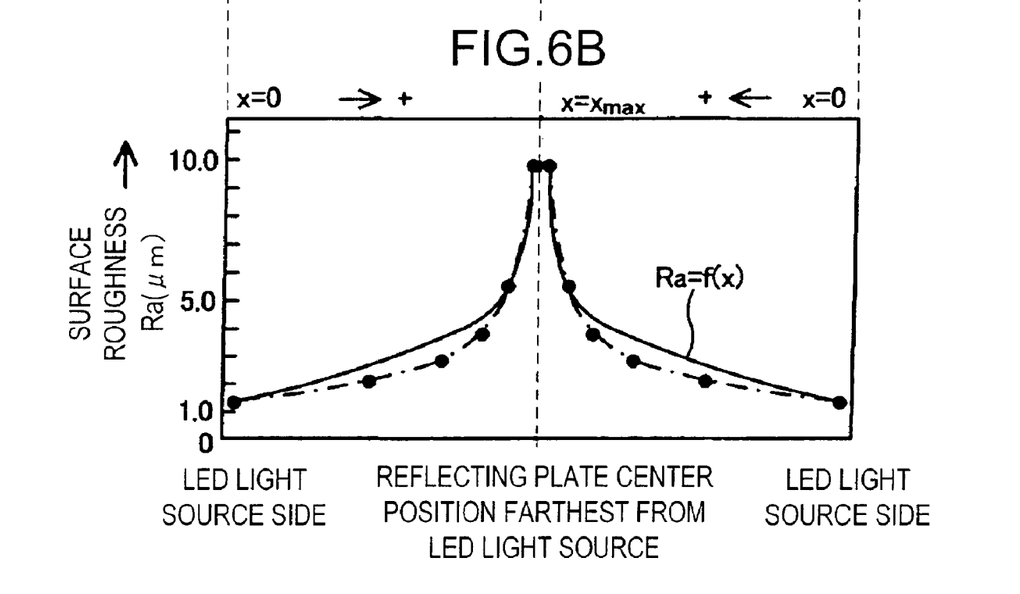
FIG. 6B is a graph showing a relationship between a distance from an edge end and surface roughness of a reflecting surface member used in the backlight unit according to the second embodiment.

Referring now to FIGS. 6A and 6B, a backlight unit 30A according to a second embodiment of the present invention will be described below. The structure of the backlight unit 30 according to the present embodiment is substantially the same as that of the first embodiment illustrated in FIGS. 1 and 2. Accordingly, commonly employed elements are assigned with the same reference symbols.

A reflecting surface member 2C in the backlight unit 30A according to the present embodiment is formed so that surface roughness Ra thereof gradually increases as the reflecting surface member goes farther toward the ridge line from an edge end adjacent to the LED light source unit 5 as shown in a graph of FIG. 6B. That is to say, the surface roughness Ra of the reflecting surface member 2C is defined to be Ra>1 μm and a value nearest to 1 μm at the edge end x=0, to be maximum at a central ridge position $x=x_{max}$ of the reflecting surface member 2C and to gradually increase as a function defined by a continuous increase function Ra=f(x), such as a linear function, quadric function or Exp function, as the distance x increases between the edge end and the central ridge position.

According to the present embodiment, generation of brighter line can be suppressed while the reflection efficiency of the surface of the reflecting surface member 2C is being maintained high to some degree. Specifically, a brighter line typically occurs in a region B in the vicinity of the center of the light-emitting surface as illustrated in FIG. 2. Accordingly, the surface roughness Ra of the reflecting surface member 2C needs to be increased on a surface at a predetermined distance or more from the light source. On the contrary, when the surface roughness Ra is high, reflectance lowers, which darkens the light emitting surface. Thus, in a region in which generation of a brighter line by spectrally reflected light on the light emitting surface should be prevented, the surface is flattened. On the other hand, in a region in which a brighter line is to be generated, the surface roughness Ra is increased and while the reflection efficiency is being maintained high to some degree, generation of the brighter line can be suppressed.

Figure 5B:
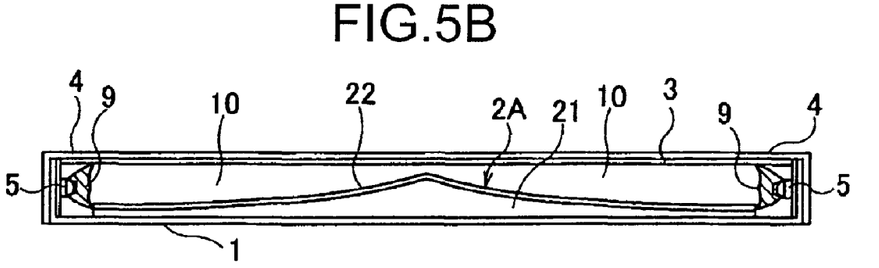
Figure 5C:
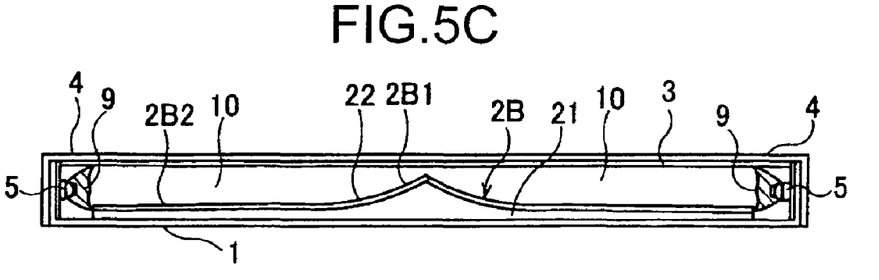

In the present embodiment as well, any of reflecting surface members 2C having the shapes illustrated in FIGS. 5A to 5C may be used. In addition, the roughness Ra may be set at substantially the same degree as that of the first embodiment.

For a collecting lens, an ordinary cylindrical lens may be used in place of a total internal reflection collimeter lens 9. In addition, the reflecting surface member 2 may be a member having a surface processed into reflective diffusing surface by forming an integrated article.

Figure 7:
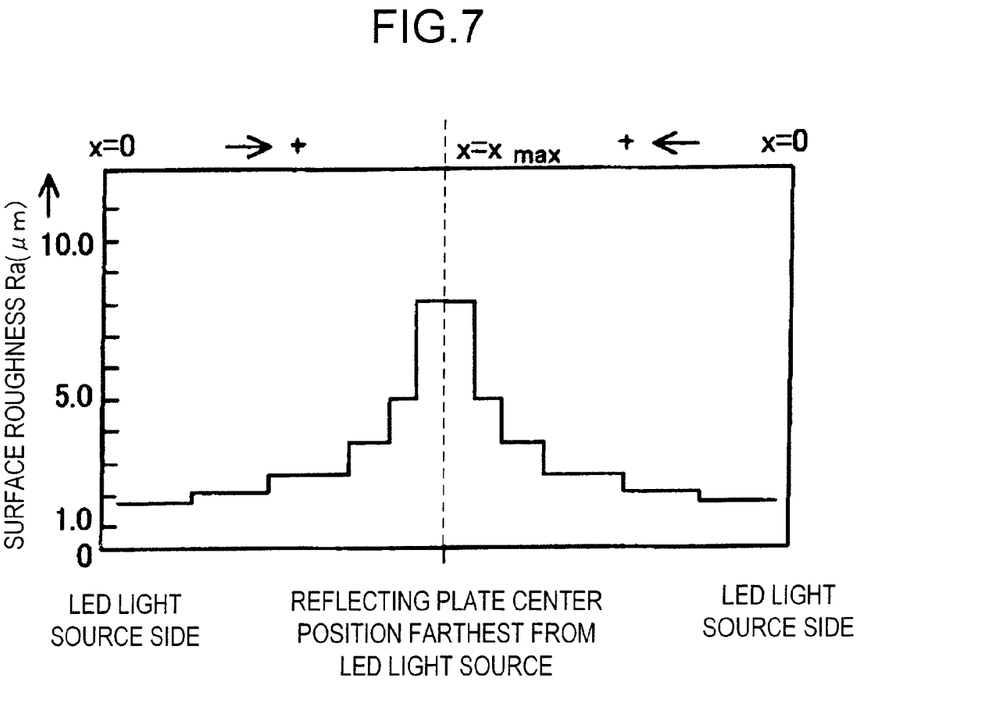
FIG. 7 is a graph showing a relationship between a distance from an edge end and surface roughness of a reflecting surface member of another example used in the backlight unit according to the second embodiment.

Further, in the present embodiment, the surface roughness Ra of the reflecting surface member 2C is set to increase in a continuous function manner, as illustrated in FIG. 6B. Alternatively, the present embodiment may use a reflecting surface member having a surface roughness Ra increasing in a step-like manner according to the distance x, as shown in a graph of FIG. 7.

Third Embodiment

Figure 8:
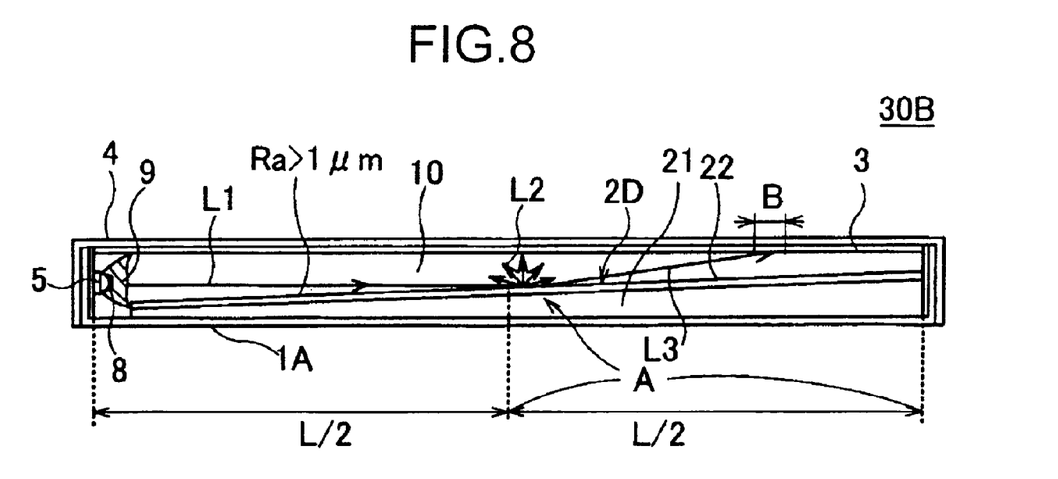
FIG. 8 is a cross-sectional view of a backlight unit according to a third embodiment of the present invention.

Referring to FIG. 8, a backlight unit 30B according to a third embodiment of the present invention will be described below. The backlight unit 30B in the present embodiment has a single incidence type structure in which a reflecting surface member 2D of a single slope structure is attached onto the bottom portion of the unit case 1A and the LED light source unit 5 is installed on a single side of the unit case 1A. That is to say, the backlight unit 30B is a single incidence type backlight unit that allows light to be incident into the hollow light guide space 10 from the LEDs of the LED light source unit 5 and reflects the light on the light emitting surface member 3 side with the reflecting surface member 2D.

The present embodiment as well uses a member having a surface state used in the first embodiment, that is, a reflecting surface member 2D set so that the surface roughness Ra satisfies Ra>1 μm. In the present embodiment, other configurations are common to the first and the second embodiments; therefore, common elements are assigned the same reference symbols.

In the backlight unit 30B as well according to the present embodiment, the surface roughness of the reflecting surface member 2D is set to Ra>1 μm, thus performing light emission with uniform brightness without generation of a brighter line on a light emitting surface.

In the present embodiment as well, the surface of the reflecting surface member 2D is provided so that surface roughness of the diffusion reflecting sheet 22 satisfies Ra>1 μm over the entire surface. However, the embodiment is not limited thereto and may use a member having a surface state provided so that only a portion corresponding to a region A which the collected light from the collimator lens 9 is intensively applied is made into a rough surface having roughness of Ra>1 μm and the portion is made into a flat smooth surface of Ra≦1 μm and further a mirror-state surface.

Figure 9A:
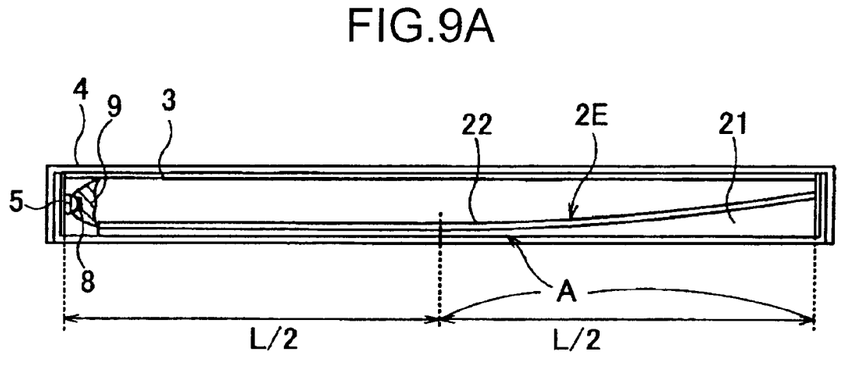
FIG. 9 is a cross-sectional view illustrating a configuration of a modified example of a reflecting surface member in the backlight unit according to the third embodiment.
Figure 9B:
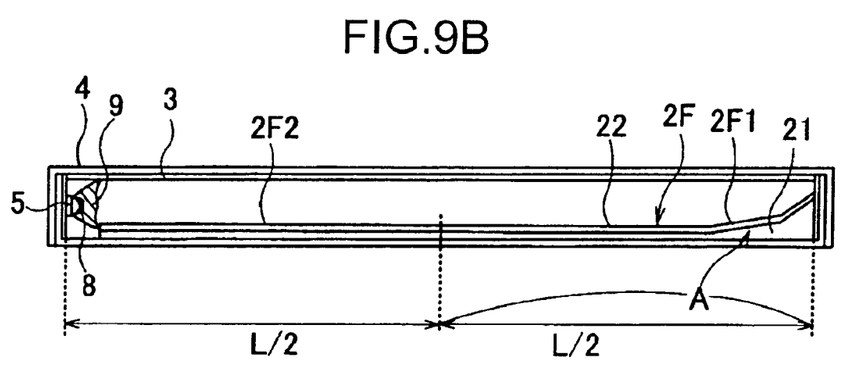

In addition, in the present embodiment, the shape of the reflecting surface member 2D is of a single-inclined surface type. In this case, as illustrated in FIG. 9A, there may be used a curved single-inclined surface type reflecting surface member 2E, the height of which continuously becomes lower as the inclined surface comes nearer to the LED light source unit 5 from an end portion farthest from the LED light source unit 5. As illustrated in FIG. 9B, there may be used a reflecting surface member 2F which has an inclined surface 2F1 on the end portion side farther from the LED light source unit 5 and a flat surface 2F2, the height of which is constant, on the side nearer to the LED light source unit 5.

In addition, the backlight unit 30B according to the present embodiment may use an integrated molded article having a roughed reflecting surface member 2D. Further, the surface of the reflecting surface member 2D may be formed to have a surface roughness Ra set to satisfy Ra>1 μm for only the portion corresponding to a region A on which the light from the LED light source unit 5 is intensively applied and to have a flat smooth surface or a mirror surface satisfying Ra≦1 μm for other portions. Further, as described in the second embodiment, the reflecting surface member 2D may use a member having Ra which gradually increase in a continuous function manner or a step function manner according to a distance x from the light source side end portion of the hollow light guide space 10.

The respective embodiments above describes the backlight unit for a liquid crystal display; however, the hollow type planar illuminating device having a structure in the embodiment above may also be applied to other applications, such as ordinary housing illuminating devices for illumination of ceilings, floors and wall surfaces, advertising board displayed at public places or rear surface illumination for cinema films.

What is claimed is:
1. A hollow type planar illuminating device, comprising:
a reflecting surface member disposed on a bottom surface of a hollow unit case and having a reflecting surface inclined with respect to the bottom surface;

a light emitting surface member disposed at a position within the unit case facing the reflecting surface member in parallel to the bottom surface of the unit case;

an LED light source unit including a plurality of LEDs arranged to be adjacent to each other on at least one side of a hollow light guide space extending between the light emitting surface member and the reflecting surface member and emitting light to the hollow light guide space; and a light collecting lens disposed along the LED light source unit to reduce a directivity angle of the light emitted from the LED light source unit, wherein the reflecting surface of the reflecting surface member is arranged to increase the height thereof according to a distance from the LED light source unit, and has a roughness Ra of $1\ \mu m < Ra < 10\ \mu m$.

2. The hollow type planar illuminating device according to claim 1, wherein the reflecting surface member comprises a mountain-shaped inclined surface positioned in the center of the unit case and including inclined surfaces on both sides thereof, taking a straight line in parallel to one side of the case as a ridge line, and the LED light source unit and the light collecting lens are arranged to be adjacent to each other on both sides of the hollow light guide space.

3. The hollow type planar illuminating device according to claim 1, wherein the roughness Ra of the reflecting surface of the reflecting surface member in a band-like region on which the emitted light from the LED light source unit is directly incident is $Ra > 1\ \mu m$ and the roughness Ra in any other region of the surface of the reflecting surface member is $Ra \leq 1\ \mu m$.

4. The hollow type planar illuminating device according to claim 3, wherein the light collecting lens is a total internal reflection type collimator lens.

5. The hollow type planar illuminating device according to claim 1, wherein the roughness Ra of the surface of the reflecting surface member is formed to increase as a distance from the LED light source unit increases.

6. The hollow type planar illuminating device according to claim 5, wherein the light collecting lens is a total internal reflection type collimator lens.

7. The hollow type planar illuminating device according to claim 1, wherein the reflecting surface member comprises an inclined surface rising up as the inclined surface comes nearer to an end portion of the side farther from the LED light source unit and the LED light source unit and the collecting lens are arranged to be adjacent to each other on one side of the hollow light guide space.

8. The hollow type planar illuminating device according to claim 7, wherein the roughness Ra of the reflecting surface of the reflecting surface member in a band-like region on which the emitted light from the LED light source unit is directly incident is $Ra > 1\ \mu m$ and the roughness Ra in any other region of the surface of the reflecting surface member is $Ra \leq 1\ \mu m$.

9. The hollow type planar illuminating device according to claim 8, wherein the collecting lens is a total internal reflection type collimator lens.

10. The hollow type planar illuminating device according to claim 7, wherein the roughness Ra of the surface of the reflecting surface member is formed to increase as a distance from the LED light source unit increases.

11. The hollow type planar illuminating device according to claim 7, wherein the collecting lens is a total internal reflection type collimator lens.

\* \* \* \* \*